US008826206B1

(12) United States Patent
Huston et al.

(10) Patent No.: US 8,826,206 B1
(45) Date of Patent: Sep. 2, 2014

(54) TESTING TWO-STATE LOGIC POWER ISLAND INTERFACE

(71) Applicant: International Business Machines Coporation, Armonk, NY (US)

(72) Inventors: Elspeth Anne Huston, Fiskill, NY (US); Johannes Koesters, Weil im Schoenbuch (DE); Klaus-Dieter Schubert, Schoenaich (DE); Marshall D. Tiner, Elgin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/888,881

(22) Filed: May 7, 2013

(51) Int. Cl.
*G06F 9/455* (2006.01)
*G06F 17/50* (2006.01)
*G06F 11/22* (2006.01)

(52) U.S. Cl.
USPC ............................. 716/109; 716/133; 716/136

(58) Field of Classification Search
USPC .......................................... 716/109, 133, 136
See application file for complete search history.

(56) References Cited

U.S. PATENT DOCUMENTS

| 7,810,058 | B1* | 10/2010 | Tuan | 716/109 |
| 2007/0101172 | A1* | 5/2007 | Ohyama | 713/300 |
| 2007/0168172 | A1* | 7/2007 | Hong et al. | 703/14 |
| 2011/0257942 | A1* | 10/2011 | Ankory et al. | 703/1 |

* cited by examiner

*Primary Examiner* — Suresh Memula
(74) *Attorney, Agent, or Firm* — Cantor Colburn LLP; Margaret McNamara

(57) ABSTRACT

An aspect includes a computer program product for implementing a model of an electrical circuit including a first region and a second region, the first region including simulated logic and a simulated latch circuit. The computer program product includes a tangible storage medium readable by a processing circuit for performing a method. The method includes receiving, as simulated logical inputs to the simulated logic a simulated power supply voltage state of the first region, a simulated data input signal and a simulated clock signal. The method also includes generating, based on determining that the simulated power supply voltage state of the first region corresponds to an inactive state of the first region, a pseudo-random number as an output of the simulated latch circuit, the pseudo-random number generated based on the simulated data input signal and the simulated data output signal from the simulated latch circuit.

20 Claims, 8 Drawing Sheets

| Input | Output |
|---|---|
| VDD High | Normal latch output |
| VDD Low | Pseudo-random value output |

US 8,826,206 B1

TESTING TWO-STATE LOGIC POWER ISLAND INTERFACE

BACKGROUND

The present invention relates generally to testing a power island interface in a circuit, and more specifically, to a two-state logic power island interface test methodology.

Increasing power consumption in semiconductor chips requires that entire portions of the chips be turned off to save power, when the system does not require the use of the portions of the chip. The portions that can be turned on and off while other portions of the chip remain on and operational are referred to as "power islands."

For example, U.S. Pat. No. 7,305,639 entitled "Method And Apparatus For Specifying Multiple Voltage Domains and Validating Physical Implementation And Interconnections In A Processor Chip" filed Feb. 12, 2005 teaches that a processor chip may include multiple power domains, each including multiple components that share a same power level, and that each power domain may be powered on or off at different times. The entire disclosure of U.S. Pat. No. 7,305,639 is hereby incorporated by reference.

When a power island is turned off, an adjacent "on" portion of the chip may receive an unintended logic input from the power island. While logical simulation may be used to test for the problem using multi-state logic, this increases the amount of data that needs to be processed and as a consequence slows down simulation significantly.

SUMMARY

Embodiments include a method, system, and computer program product for implementing a model of an electrical circuit including a first region and a second region, the first region including simulated logic and a simulated latch circuit, and the simulated latch circuit configured to output data to the second region.

The computer program product includes a tangible storage medium readable by a processing circuit and storing instructions for execution by the processing circuit for performing a method. The method includes receiving, by a processor, as simulated logical inputs to the simulated logic a simulated power supply voltage state of the first region, a simulated data input signal and a simulated clock signal. The method also includes generating, by the processor, based on determining that the simulated power supply voltage state of the first region corresponds to an inactive state of the first region, a pseudo-random number as an output of the simulated latch circuit, the pseudo-random number generated based on the simulated data input signal and the simulated data output signal from the simulated latch circuit.

The system includes memory configured to store a model of the electrical circuit and a processor configured to receive and generate inputs to, and outputs from, the model. The system is configured to perform a method including receiving, by the processor, as simulated logical inputs to the simulated logic a simulated voltage state of the simulated latch circuit, a simulated data input signal and a simulated clock signal. The method also includes generating, by the processor, based on determining that the simulated voltage state of the simulated latch circuit corresponds to an inactive state of the simulated latch circuit, a pseudo-random number as an output of the simulated latch circuit based on the simulated data input signal and a simulated data output signal from the simulated latch circuit.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Semiconductor chips including microcontrollers and other processors include may include both power-on regions and power-off regions simultaneously. A region that is powered off within a power-on region, referred to as a power island, may in some circumstances provide unintended logic outputs to the power-on region. Embodiments generate pseudo-random numbers in a power-off region to simulate unintended logic outputs to test fence circuits of the power-on region.

Figure 1:
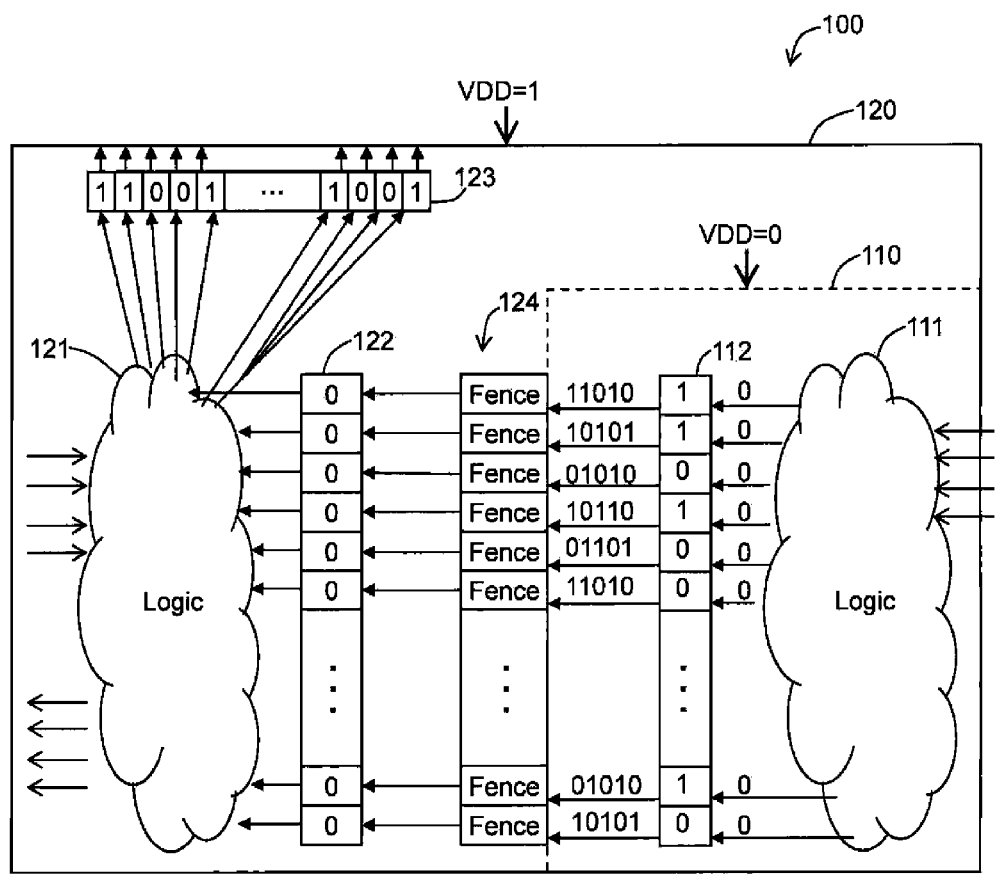
FIG. 1 depicts an electrical circuit in accordance with an embodiment.

Turning now to FIG. 1, an electronic circuit 100 is generally shown. The electronic circuit 100 may be a model of an electrical circuit, such as an electronic or digital representation of the electrical circuit 100 for purposes of modeling and testing. The model may include software structures representing each of the components in the electronic circuit 100. The circuit 100 includes a first region 110 and a second region 120. The first region 110 includes logic 111 and a series of latch circuits 112 configured to receive data output from the logic 111, latch the data, and output the data from the latch circuits 112 to the second region 120. The second region includes logic 121, a first series of latches 122 that receives the data from the latch circuits 112 in the first region 110 and a second series of latches 123 that latches data output from the logic 121. Arrows represent data into and out of the logic 111 and 121. As mentioned above, the electronic circuit 100 may be a model of a physical electronic circuit, such that the logic 111 and 121, latch circuits 112, latches 122 and other elements of the electronic circuit 100 are simulated in software that is executed by a processor of a computing system. For purposes of clarity, the term "simulated" is not included with each instance of the elements of the electronic circuit 100 throughout the present description, even though each component and signal may be a simulated component or signal.

The second region 120 also includes a fence circuit 124 configured to block data from the first region 110 when the first region 110 is powered off (VDD=0) and to allow the data from the first region 110 to pass through to the series 122 of latches when the first region is powered on (VDD=1).

In FIG. 1, the first region 110 is illustrated as having a power off state, or VDD=0, while the second region 120 is illustrated as having a power on state, or VDD=1. However, it is understood that each of the first and second regions 110 and 120 may have power turned on or off according to the desired operation of the electronic circuit 100.

In operation, when the first region is powered on, the data in the latch circuits 112 changes according to the output of the logic 111. The data from the latch circuits 112 are transmitted through the fence circuit 124 to the latches 122, and from the latches 122 to the logic 121. The data may be logically combined with other data input to the logic 121 and output to the latches 123. Thus, when the first region 110 is powered on, the latch circuits 112 function normally to latch and output data to the latches 122 of the second region 120.

However, when the power is turned off to the first region 110 (VDD=0), the latch circuits 112 are configured to output pseudo-random numbers to the fence circuits 124. The pseudo-random numbers may simulate or mimic the generation of unintended logical outputs by a physical first region 110 in a physical electronic circuit 100. Since pseudo-random numbers are generated by each of the latch circuits 112, the efficacy of the fence circuits 124 is tested using many different combinations of output signals from the latch circuits 112, resulting in a more complete test of whether the physical fence circuit 124 would effectively stop output signals from the first region 110 from reaching the latches 122 of the second region 120 when the physical first region 110 is turned off.

In one embodiment, the electrical circuit 100 is a model of a physical electrical circuit. The logic 111 and latch circuits 112 may be electronic representations in software of physical logic 111 and latch circuits 112, and a processor executing the software may control operation of the electronic representations to simulate the physical devices. Similarly, the logic 121, latches 122, latches 123 and fence circuits 124 may also be electrical or digital representations of physical components.

Figures 2A, 2B:
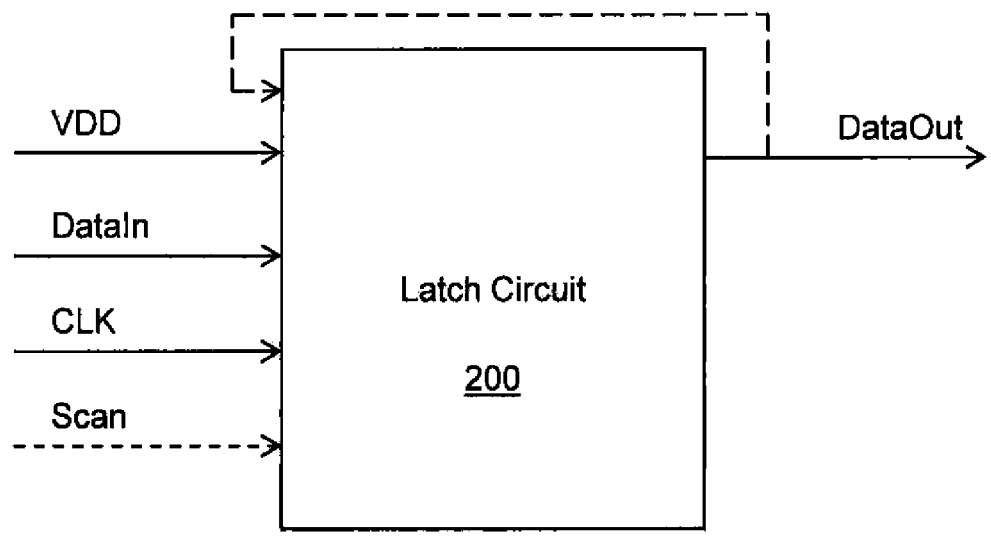
FIG. 2A depicts a latch circuit in accordance with an embodiment.
FIG. 2B depicts a latch output table of the latch circuit in accordance with an embodiment.

FIG. 2A illustrates a functional block diagram of a latch circuit 200 according to an embodiment. The latch circuit 200 corresponds to the latch circuits 112 of FIG. 1. In one embodiment, the latch circuit 200 receives as inputs a power supply voltage state signal VDD (also referred to as a voltage state signal VDD or power input signal VDD), a data input signal DataIn and a clock signal CLK and outputs a data output signal DataOut. The voltage state signal VDD is a signal that represents a voltage state supplied to the region in which the latch circuit 200 is located. For example, referring to FIG. 1, the first region 110 has a first voltage state signal VDD=0 (or low) to turn off power to the first region 110 and the second region 120 has a second voltage state signal VDD=1 (or high) to turn on power to the second region. The data input signal DataIn corresponds to input from a logic circuit, and may also include program-generated or user supplied data. The clock signal CLK is a signal of a predetermined frequency that acts to synchronize the latch circuit 200 with other electrical components. In addition, in some embodiments, the latch circuit also receives as an input a scan signal Scan, and the data output signal DataOut, represented by dashed lines. The scan signal Scan is generated to indicate that the latch circuit 200 is receiving scan data which may be used to complement or over-ride regular data inputs for purposes of testing.

FIG. 2B illustrates an output table of the latch circuit 200 according to one embodiment. When the latch circuit 200 determines that the voltage state signal VDD is high, a normal latch output signal is generated based on the data input signal DataIn and the clock signal CLK. A normal latch output includes latching of a data input signal DataIn according to a state of the clock signal CLK and outputting the latched value as the data output signal DataOut until a next latch even of the clock signal CLK.

When the latch circuit 200 determines that the voltage state signal VDD is low, the latch circuit 200 is configured to generate a pseudo-random value.

Figure 3:
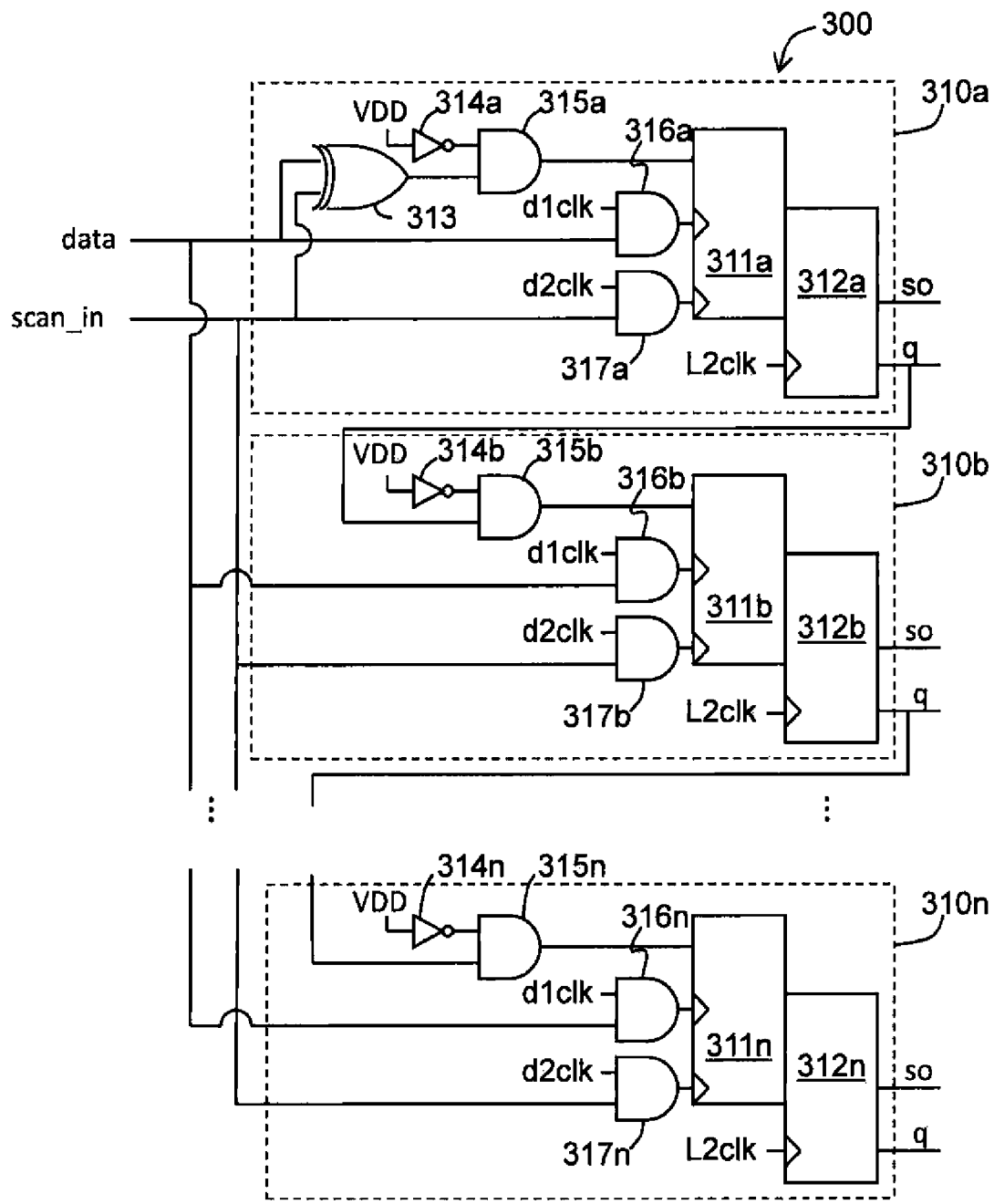
FIG. 3 depicts a series of latch circuits according to an embodiment.

FIG. 3 illustrates an example of a series 300 of latch circuits according to an embodiment. A first latch circuit 310a includes a first latch 311a and a second latch 312a. A data output of the first latch 311a is connected to a data input of the second latch 312a. The second latch 312a includes a data output "q" and one or more additional outputs, such as a scan output "so."

The first latch circuit 301a includes an XOR logic gate 313 having as inputs a data input signal "data" and a scan input signal "scan_in." The first latch circuit 301a also includes a first AND gate 315a having as inputs an output of the XOR gate 313 and a power supply voltage state signal VDD, via an inverter 314a. The first latch circuit 301a also includes second and third AND gates 316a and 317a. The second AND gate 316a has logical inputs of the data input signal "data" and a first clock signal "d1clk" and an output connected to a first clock input of the first latch 311a. The third AND gate 317a has logical inputs of the scan input signal "scan_in" and a second clock signal "d2clk" and an output connected to a second clock input of the first latch 311a. A third clock signal L2clk is connected to a clock input of the second latch 312a.

The second latch circuit 310b includes a first latch 311b and a second latch 312b. A data output of the first latch 311b is connected to a data input of the second latch 312b. The second latch 312b includes a data output "q" and one or more additional outputs, such as a scan output "so."

The second latch circuit 310b includes a first AND gate 315b having as inputs a data output "q" of the first latch circuit 310a and the power supply voltage state signal VDD, via an inverter 314b. The second latch circuit 301b also includes second and third AND gates 316b and 317b. The second AND gate 316b has logical inputs of the data input signal "data" and the first clock signal "d1clk" and an output connected to a first clock input of the first latch 311b. The third AND gate 317b has logical inputs of the scan input signal "scan_in" and the second clock signal "d2clk" and an output connected to a second clock input of the first latch 311b. The third clock signal L2clk is connected to a clock input of the second latch 312b.

Each subsequent latch, represented by the ellipses between the latch circuits 310b and 310n, has a same configuration as the second latch circuit 310b. As an example, FIG. 3 illustrates a third latch circuit 310n, representing a last latch circuit in the series 300 of latch circuits, which may include any finite number of latch circuits. The third latch circuit 310n includes a first latch 311n and a second latch 312n. A data output of the first latch 311n is connected to a data input of the second latch 312n. The second latch 312n includes a data output "q" and one or more additional outputs, such as a scan output "so."

The third latch circuit 310n includes a first AND gate 315n having as inputs a data output "q" of a previous latch circuit, which may be the second latch circuit 310b or a latch circuit represented by the ellipses between the second latch circuit 310b and the third latch circuit 310n. The first AND gate 315n also has as an input the power supply voltage state signal VDD, via an inverter 314n. The third latch circuit 310n also includes second and third AND gates 316n and 317n. The second AND gate 316n has logical inputs of the data input signal "data" and the first clock signal "d1clk" and an output connected to a first clock input of the first latch 311n. The third AND gate 317n has logical inputs of the scan input signal "scan_in" and the second clock signal "d2clk" and an output connected to a second clock input of the first latch 311n. The third clock signal L2clk is connected to a clock input of the second latch 312n.

In operation, when the VDD signal is high, meaning the region in which the series 300 of latches is located is turned on, the latch circuits 310a to 310n performs a regular latching operation based on the inputs d1clk, d2clk, L2clk and "data." However, when the VDD signal is low, meaning the region in which the latch is located is turned off, the outputs of the latch circuits 310a to 310n are based on the output signal "q," the data input signal "data," and the scan input signal scan_in, ensuring that both high and low data output signals "q" are output from the latch to provide a pseudo-random output.

Figure 4:
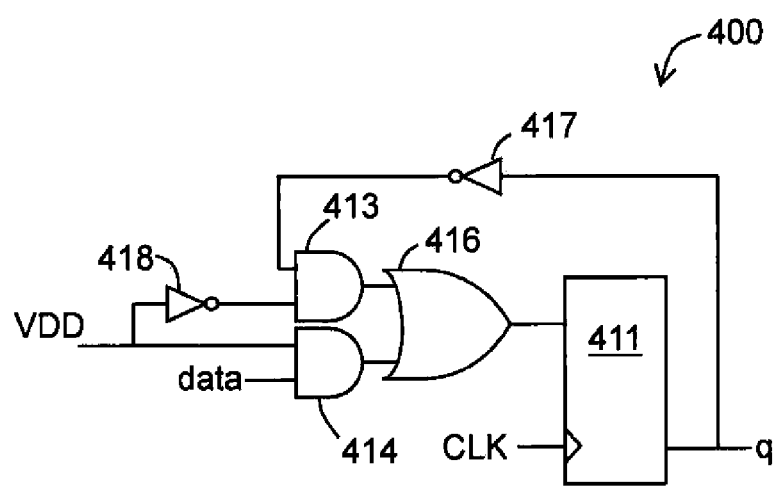
FIG. 4 depicts a latch circuit according to an embodiment.

FIG. 4 illustrates a latch circuit 400 according to another embodiment. The latch circuit 400 includes a latch 411, a first AND gate 413, a second AND gate 414 and an OR gate 416. The first AND gate 413 has as inputs the output data signal "q" of the latch 411, via an inverter 417, and a power supply voltage state signal VDD, via the inverter 418. The second AND gate 414 has as inputs the power supply voltage state signal VDD and a data input signal "data."

In operation, when the VDD signal is high, meaning the region in which the latch 400 is located is turned on, the latch 411 performs a regular latching operation based on the data input. In other words, the first AND gate 413 will be turned off, and the second AND gate 414 will be turned on every time the data signal is high. However, when the VDD signal is low, meaning the region in which the latch is located is turned off, the output of the latch 411 is based on the output signal "q" ensuring that both high and low data output signals "q" are output from the latch to provide a pseudo-random output.

Figure 5:
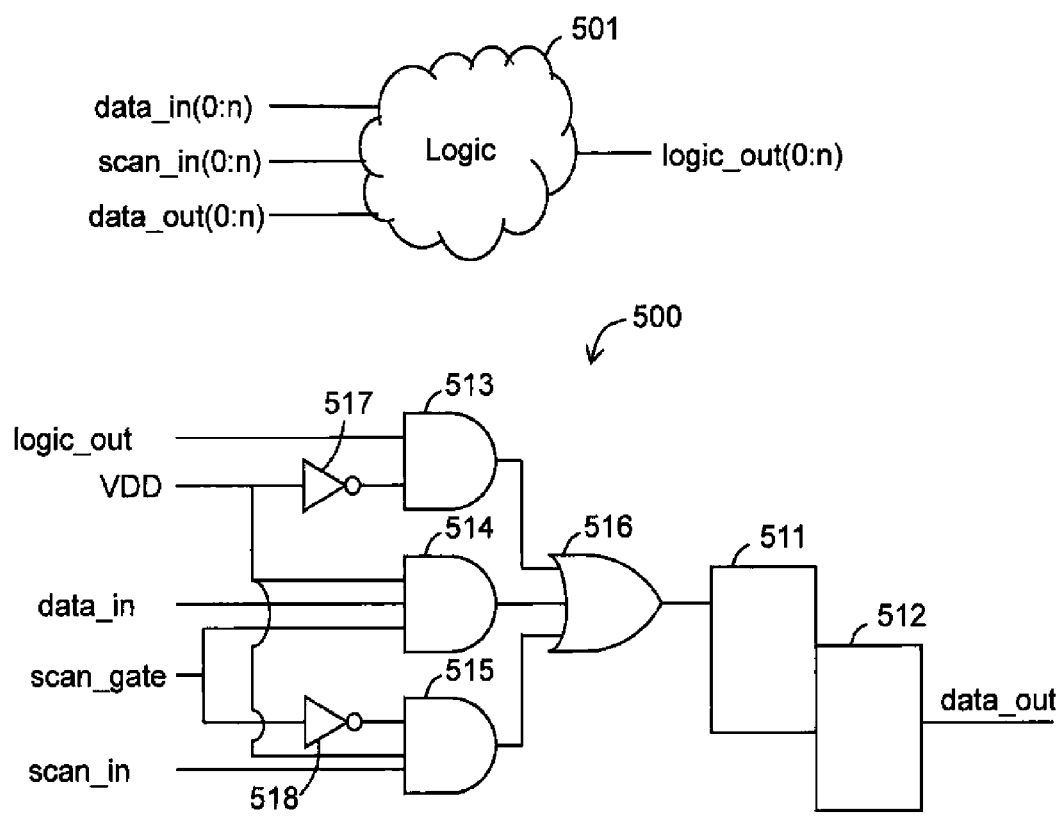
FIG. 5 depicts a latch circuit according to an embodiment.

FIG. 5 illustrates a latch circuit 500 according to another embodiment. The latch circuit 500 includes first and second latches 511 and 512. A data output of the first latch 511 is input to a data input of the second latch 512. The latch circuit 500 includes first, second and third AND gates 513, 514 and 515. The latch circuit 500 also includes an OR gate 516, receiving as inputs the outputs from the AND gates 513, 514 and 515. The clock signals of the latch circuit 500 are omitted for purposes of description.

The first AND gate receives as inputs an output signal (logic_out) from a logic circuit 501. In embodiments, the logic circuit 501 receives as inputs a data input signal data_in, a scan input signal scan_in, and a data output signal data_out, wherein the symbols "(0:n)" represent a plurality of each signal from 0-n, where n is an integer of 1 or greater. The first AND gate 513 also receives as an input a power supply voltage state signal VDD via an inverter 517.

The second AND gate 514 receives as inputs the voltage state signal VDD, the data input signal, data_in, and a scan_gate signal. The third AND gate 515 receives as inputs the voltage state signal VDD, the scan_gate signal via an inverter 518 and a scan input signal scan_in. In one embodiment, multiple different latch circuits 500 each receive as inputs a separate logic output signal logic_out, a separate data input signal data_in, a same scan_gate signal and a separate scan input signal scan_in. In embodiments, the logic output signal input to the first AND gate 513 is the same logic output signal output from the logic 501. Similarly, the data input signal data_in and the scan input signal scan_in are the same signals that are input to the logic 501. In addition, the data output signal data_out output from the latch circuit 500 is input to the logic 501 as a logical input.

FIGS. 3 through 5 illustrate different examples of latch circuits according to different embodiments. The latch circuits the present embodiments may be electronic or digital models of physical circuits, such as data stored in memory that may be accessed and executed by a processor to simulate the functions of physical devices, such as latches, AND gates, XOR gates, OR gates and inverters. The models of the physical circuits may include digital representations of structures and characteristics, such as power characteristics of transistors that make up logic gates, inverters and latches. Inputs to the models may be controlled and changed based on user inputs or pre-stored programs to test the functionality of a physical circuit based on the digital model. In alternative embodiments, the latch circuits illustrated in FIGS. 3 through 5 may be physical devices comprising physical structures, such as transistors and other circuitry, that perform the latch functions, inversion functions and logic functions.

While a few physical examples of latch circuits have been provided by way of description, embodiments of the invention are not limited to the particular circuits described, including the particular XOR gates or AND gates described in FIGS. 3 to 5. Instead, embodiments of the invention encompass any circuit that generates a pseudo-random output, switching between 1's and 0's, or highs and lows, based on applying a power VDD signal to a gate of logic circuits. The logic circuits are configured to generate deterministic or repeatable patterns that depend on a starting state, to generate pseudo-random switching on output circuits that does not stabilize over time, and to use only locally available inputs and outputs of a manipulated circuit. Accordingly, while an XOR gate may be utilized, as illustrated in FIG. 3, embodiments of the invention also encompass other logic circuits, such as a toggle latch.

Figure 6:
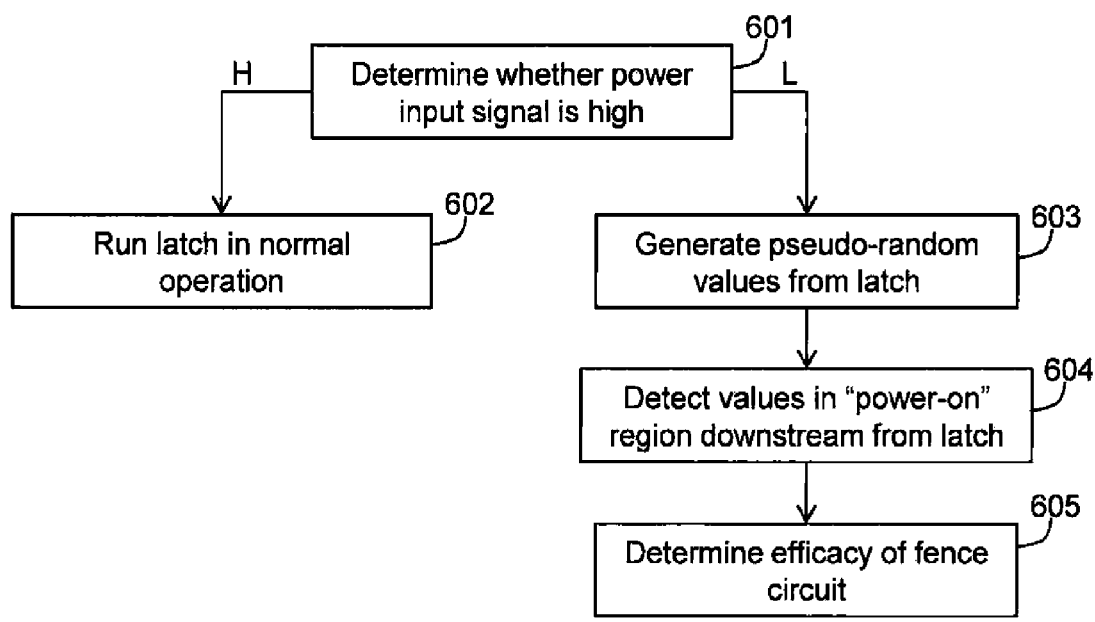
FIG. 6 depicts a process flow for testing power islands in accordance with an embodiment.

FIG. 6 illustrates a flow diagram of a method according to an embodiment. In block 601, it is determined whether a power input signal to a region of an electronic circuit is high or low. The electronic circuit includes logic circuitry and latch circuits. The logic circuitry receives data as inputs and feeds the data to the latch circuits, which latch the data to output the latched data to another region of the electronic circuit.

If it is determined in block 601 that the power input signal is high, then the latch circuits are run normally in block 602 to receive data from the logic circuitry, latch the data based on clock signals, and output the latched data according to the clock signals. On the other hand, if it is determined in block 601 that the power input signal is low, then the latch circuits are configured to generate pseudo-random values in block 603. In embodiments, the latch circuits include logic gates at the inputs of latches. The logic gates receive as input logic the power input signal, a data input signal from the logic of the same region of the electronic circuit and the data output signal of the latch circuit, or of another latch circuit in a series of latch circuits. The logic gates are configured to pass data values through to the latches when the power input signal is high (block 602) and to generate pseudo-random values (block 603) based on the data input signal and data output signal when the power input signal is low. The pseudo-random numbers may also be based on scan input signals when the latch circuits include multiple latches per latch circuit.

In block 604, the input values are detected in a "power-on" region adjacent to the "power-off" region in which the latch circuits are located. For example, the power-on region may include input latches connected to the output latch circuits of the power-off region. A fence circuit may be located between the input latches of the power-on region and the output latch circuits of the power-off region. The fence circuit may be configured to pass data when the power-off region is powered on, and to halt the flow of data from the power-off region to the power-on region when the power-off region is powered off. In block 604, values output from the fence circuit to the input latches of the power-on region may be detected.

In block 605, the efficacy of the fence circuit may be determined based on the detected values downstream from the output latch circuits of the power-off region. For example, since the output latch circuits generate pseudo-random numbers when the power-off region is powered off, the fence circuit may be analyzed with a variety of different inputs corresponding to the pseudo-random numbers generated by the output latch circuits. If values of the input latches of the power-on region change, then it may be determined that one or more fence circuits or segments of a fence circuit are faulty.

Figure 7:
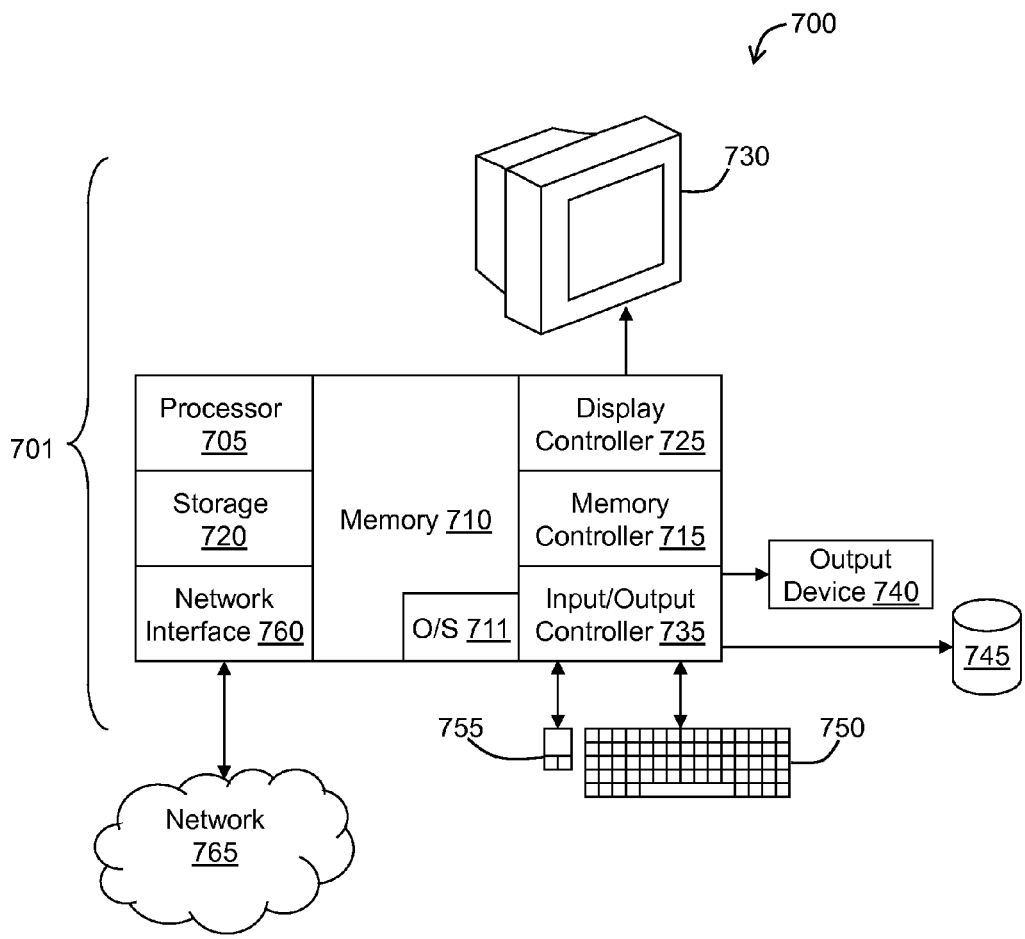
FIG. 7 depicts a computer system according to an embodiment.

FIG. 7 illustrates a block diagram of a system 700 for modeling an electrical circuit according to one embodiment. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 700 therefore includes general-purpose computer 701 as illustrated in FIG. 7.

In an exemplary embodiment, in terms of hardware architecture, as shown in FIG. 7, the computer 701 includes a processor 705, memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute instructions stored within the memory 710, to communicate data to and from the memory 710, and to generally control operations of the computer 701 pursuant to the instructions.

According to embodiments, the computer 701 may have stored in memory 710 models corresponding to electronic circuits, such as the electronic circuit 100 of FIG. 1, including multiple regions within a same semiconductor chip or processor which may be separately powered on and powered off. The processor 705 may execute a program stored in memory 710 to model operation of the electronic circuit in states in which first and second regions are powered on and in which a first region is powered off while a second region is powered on. The processor 705 may execute the program to simulate latch circuits in the first region having input logic that causes the latch circuits to generate pseudo-random values as outputs of the latch circuits when the first region is powered off. The processor 705 may further detect values at the outputs of fence circuits connected to the latch circuits to determine the efficacy of the fence circuits in preventing data flow from the first region when the first region is powered off.

As will be appreciated by one skilled in the art, one or more aspects may be embodied as a system, method or computer program product. Accordingly, one or more aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
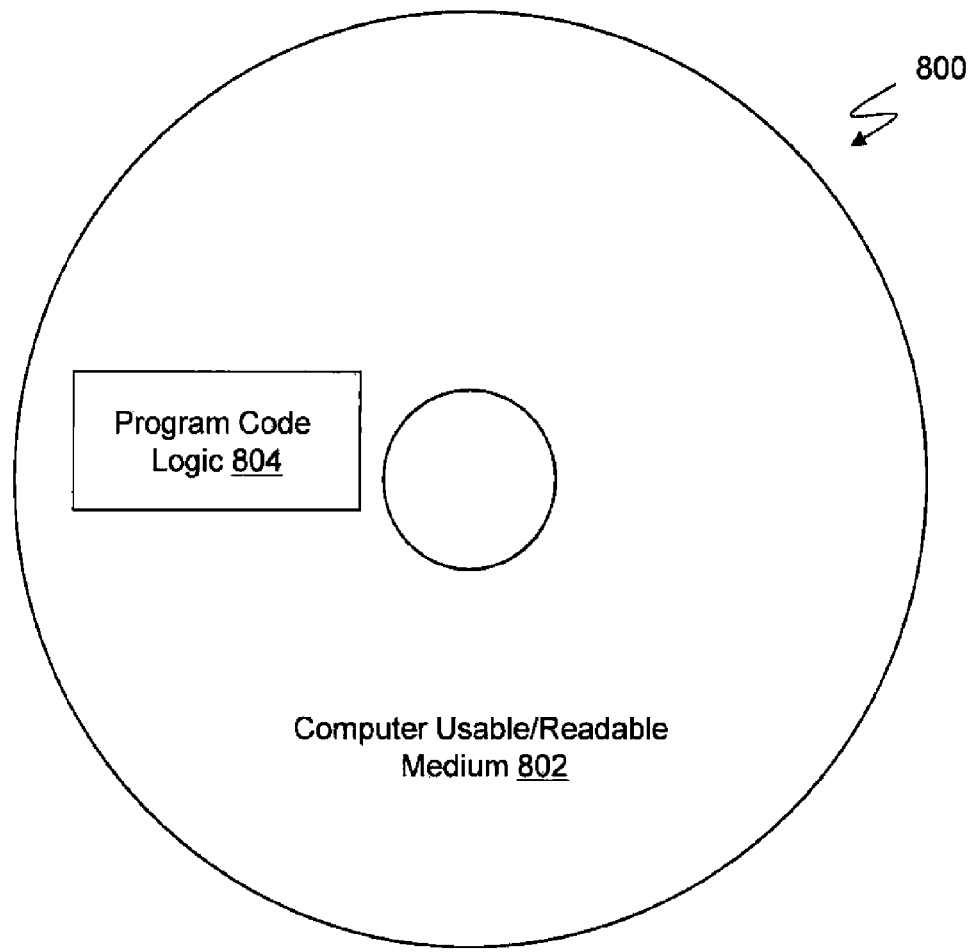
FIG. 8 depicts a computer program product in accordance with an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of embodiments.

Technical effects and benefits include providing latch circuits that are capable of generating pseudo-random numbers to test fence circuits when power is turned off to one region of a circuit or chip, while power is kept on in another region. The pseudo-random numbers are generated based on logical input values, including a data input signal and data output signal, as well as a scan input signal, without requiring the use of additional latches or registers to generate the pseudo-random numbers.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for implementing a model of an electrical circuit including a first region and a second region, the first region including simulated logic and a simulated latch circuit, the simulated latch circuit configured to output a simulated data output signal to the second region, the computer program product comprising:
a tangible storage medium readable by a processing circuit and storing instructions for execution by the processing circuit including a processor for performing a method comprising:
receiving, by the processor, as logical inputs to the simulated logic, a simulated power supply voltage state of the first region, a simulated data input signal and a simulated clock signal; and
generating, by the processor, based on determining that the power supply voltage state of the first region corresponds to the first region being inactive, a pseudo-random number as an output of the simulated latch circuit, the pseudo-random number generated based on the simulated data input signal and the simulated data output signal from the latch circuit.

2. The computer program product of claim 1, the method further comprising generating, by the processor, based on determining that the power supply voltage state of the first region corresponds to the first region being active, a simulated normal latch output based on the simulated data input signal and the simulated clock signal.

3. The computer program product of claim 1, wherein the simulated latch circuit includes a simulated plurality of latch circuits, each simulated latch circuit comprising simulated first and second latches,
wherein simulated logical inputs to the simulated logic of each simulated latch circuit further include a simulated scan input signal, and
simulated logical inputs to the simulated logic of each simulated latch circuit other than a first simulated latch circuit among the simulated plurality of latch circuits includes a simulated latch output of the second latch of one other simulated latch circuit among the simulated plurality of latch circuits.

4. The computer program product of claim 1, wherein the simulated latch circuit includes a simulated XOR gate having as simulated inputs the simulated data input signal and the simulated scan input signal, and
the simulated latch circuit is configured to generate the pseudo-random number based on a difference between the simulated data input signal and the simulated scan signal.

5. The computer program product of claim 1, further comprising:
determining an efficacy of a simulated fence circuit in the second region connected between the simulated output of the simulated latch circuit and a simulated input of a second simulated latch circuit based on generating the pseudo-random number as the simulated output of the simulated latch circuit, the second simulated latch circuit located in the second region, the second region having a power supply voltage corresponding to an active state of the second region.

6. The computer program product of claim 1, wherein the simulated logic comprises:
a first simulated AND gate having as simulated logical inputs a power supply voltage state and a data output signal from the simulated latch circuit, and having a simulated output connected to a simulated input of a simulated latch; and
a second simulated AND gate having as simulated logical inputs a data input signal and the simulated clock signal, and having a simulated output connected to a simulated clock input pin of the simulated latch.

7. The computer program product of claim 1, wherein the simulated latch includes first and second simulated latches, a data output signal of the first simulated latch connected to a data input of the second simulated latch, and a second simulated latch clock connected to a simulated clock input of the second simulated latch, and
the simulated logic comprises:
a simulated XOR gate having as logical inputs a simulated data input signal and a simulated scan input signal; and
a first simulated AND gate having as logical inputs a simulated power supply voltage state and an output of the simulated XOR gate, and having an output connected to a simulated data input of the first simulated latch.

8. The computer program product of claim 1, wherein the simulated latch includes first and second simulated latches, a simulated data output pin of the first simulated latch connected to a simulated data input pin of the second simulated latch, and a second simulated latch clock line connected to a simulated clock input pin of the second simulated latch,
the simulated latch circuit includes a simulated plurality of latch circuits,
each of the simulated latch circuits comprises:
a first simulated AND gate having an output connected to a simulated data input of the first latch;
a second simulated AND gate having as logical inputs a first simulated clock signal and a simulated data input signal, and having an output connected to a first simulated clock input of the first simulated latch; and
a third simulated AND gate having as simulated logical inputs a second simulated clock signal and a simulated scan input signal, and an output connected to a second simulated clock input of the first simulated latch,
wherein a first simulated latch circuit among the simulated plurality of latch circuits includes a simulated XOR gate having as simulated logical inputs the simulated data input signal and the simulated scan input signal,
the first simulated AND gate of the first simulated latch circuit has as simulated logical inputs a simulated power supply voltage state and an output of the XOR gate, and
the first simulated AND gate of each other latch circuit has as simulated logical inputs the simulated power supply voltage state and an output of the second simulated latch of another single simulated latch circuit among the simulated plurality of latch circuits.

9. A computer implemented method for modeling an electrical circuit including a first region and a second region, the first region including simulated logic and a simulated latch circuit, the simulated latch circuit configured to output a simulated data output signal to the second region, the method comprising:
receiving, by a processor, as simulated logical inputs to the simulated logic a simulated voltage state of the simulated latch circuit, a simulated data input signal and a simulated clock signal; and
generating, by the processor, based on determining that the simulated voltage state of the simulated latch circuit corresponds to an inactive state of the first region, a pseudo-random number as a simulated output of the simulated latch circuit based on the simulated data input signal and a simulated data output signal from the simulated latch circuit.

10. The computer implemented method of claim 9, further comprising generating, by the processor, based on determining that the simulated voltage state of the simulated latch circuit corresponds to an active state of the first region, a simulated normal latch output based on the simulated data input signal and the simulated clock signal.

11. The computer implemented method of claim 9, wherein the simulated latch circuit includes a simulated plurality of latch circuits, each simulated latch circuit comprising first and second simulated latches,
simulated logical inputs to the simulated logic of each simulated latch circuit further include a simulated scan input signal, and
simulated logical inputs the simulated logic of each simulated latch circuit other than a first simulated latch circuit in a series of simulated latch circuits includes a simulated latch output of a second simulated latch of one other simulated latch circuit among the plurality of simulated latch circuits.

12. The computer implemented method of claim 9, further comprising:
determining an efficacy of a simulated fence circuit connected between the output of the simulated latch circuit and an input of another simulated latch circuit based on generating the pseudo-random number as the output of the simulated latch circuit.

13. The computer implemented method of claim 9, wherein the simulated logic comprises:
a first simulated AND gate having a first input connected to a simulated voltage state line, a second input connected to the simulated data output signal from the simulated latch circuit and an output connected to a simulated input of a simulated latch; and
a second simulated AND gate having a first input connected to a simulated data input line, a second input connected to a simulated clock line carrying the clock signal and an output connected to a simulated clock input pin of the simulated latch.

14. The computer implemented method of claim 9, wherein the at least one latch includes first and second simulated latches, a simulated data output pin of the first simulated latch connected to a simulated data input pin of the second simulated latch, and a second simulated latch clock line connected to a simulated clock input pin of the second simulated latch, and
the simulated logic comprises:
a simulated XOR gate having inputs connected to a simulated data input line and a simulated scan input line; and
a first simulated AND gate having inputs connected to a simulated voltage state line and a simulated output of the XOR gate, and a simulated output connected to a simulated data input of the first simulated latch.

15. The computer implemented method of claim 9, wherein the simulated latch includes first and second simulated latches, a simulated data output pin of the first simulated latch connected to a simulated data input pin of the second simulated latch, and a simulated second latch clock line connected to a simulated clock input pin of the second simulated latch,
the simulated latch circuit includes a simulated plurality of latch circuits,
each of the simulated latch circuits comprises:
a first simulated AND gate having an output connected to a simulated data input of the first latch;
a second simulated AND gate having inputs connected to a first simulated clock and a simulated data input line, and an output connected to a first simulated clock input of the first simulated latch; and
a third simulated AND gate having inputs connected to a second simulated clock and a simulated scan input line, and an output connected to a second simulated clock input of the first simulated latch,
wherein a first simulated latch circuit among the simulated plurality of latch circuits includes a simulated XOR gate having inputs connected to the simulated data input line and the simulated scan input line,
the first simulated AND gate of the first simulated latch circuit has inputs connected to a simulated voltage state line and an output of the simulated XOR gate, and
the first simulated AND gate of each other simulated latch circuit has inputs connected to the simulated voltage state line and an output of the second simulated latch of another single simulated latch circuit among the simulated plurality of latch circuits.

16. A computer system for modeling an electrical circuit including a first region and a second region, the first region including simulated logic and a simulated latch circuit, the simulated latch circuit configured to output a simulated data output signal to the second region, the system comprising:
memory configured to store a model of the electrical circuit; and
a processor configured to receive and generate inputs to, and outputs from, the model, the system configured to perform a method comprising:
receiving, by the processor, as simulated logical inputs to the simulated logic a simulated voltage state of the simulated latch circuit, a simulated data input signal and a simulated clock signal; and
generating, by the processor, based on determining that the simulated voltage state of the simulated latch circuit corresponds to an inactive state of the second region, a pseudo-random number as an output of the simulated latch circuit based on the simulated data input signal and a simulated data output signal from the simulated latch circuit.

17. The computer system of claim 16, the method further comprising generating, by the processor, based on determining that the simulated voltage state of the simulated latch circuit corresponds to an active state of the first region, a simulated normal latch output based on the simulated data input signal and the simulated clock signal.

18. The computer system of claim 16, wherein the simulated latch circuit includes a simulated plurality of latch circuits, each simulated latch circuit comprising first and second simulated latches,
simulated logical inputs to the simulated logic of each simulated latch circuit further include a simulated scan input signal, and simulated logical inputs the simulated logic of each simulated latch circuit other than a first simulated latch circuit in a series of simulated latch circuits includes a simulated latch output of a second simulated latch of one other simulated latch circuit among the simulated plurality of latch circuits.

19. The computer system of claim 16, the method further comprising:

determining an efficacy of a simulated fence circuit connected between the output of the simulated latch circuit and an input of another simulated latch circuit based on generating the pseudo-random number as the simulated output of the simulated latch circuit.

20. The computer system of claim 16, wherein the simulated latch circuit includes a simulated XOR gate having as inputs the simulated data input signal and the simulated scan input signal, and the simulated latch circuit is configured to generate the pseudo-random number based on a difference between the simulated data input signal and the simulated scan signal.

* * * * *